United States Patent [19]

Fillman

[11] Patent Number: 4,582,081
[45] Date of Patent: Apr. 15, 1986

[54] VACUUM BREAKER

[75] Inventor: Russell L. Fillman, Colorado Springs, Colo.

[73] Assignee: Woodford Manufacturing Company, Colorado Springs, Colo.

[21] Appl. No.: 684,782

[22] Filed: Dec. 21, 1984

[51] Int. Cl.[4] ............................................. F16K 24/00
[52] U.S. Cl. ................................ 137/218; 137/512.4; 137/853
[58] Field of Search ..................... 137/218, 512.4, 853

[56]  References Cited

U.S. PATENT DOCUMENTS

| 384,306 | 6/1888 | Bourdil . | |
|---|---|---|---|
| 1,800,066 | 4/1931 | Glass . | |
| 2,328,382 | 8/1943 | Langdon | 137/512.4 X |
| 2,395,906 | 3/1946 | Owens | 137/218 |
| 2,621,889 | 12/1952 | Annin | 137/853 |
| 2,662,485 | 12/1953 | Ilfrey . | |
| 2,663,309 | 12/1953 | Filliung . | |
| 2,746,477 | 5/1956 | Krause et al. . | |
| 2,938,532 | 5/1960 | Fraser | 137/218 |
| 2,941,541 | 6/1960 | Peras . | |
| 2,988,103 | 6/1961 | Canvasser . | |
| 3,179,124 | 4/1965 | Haring . | |
| 3,307,571 | 3/1967 | Smith . | |
| 3,346,001 | 10/1967 | Camp . | |
| 3,384,113 | 5/1969 | Pennisi | 137/853 |
| 3,417,775 | 12/1968 | Smith . | |
| 3,447,559 | 6/1969 | McCornack | 137/218 |
| 3,448,766 | 6/1969 | Schule . | |
| 3,618,629 | 11/1971 | Heyer et al. | 137/218 |
| 3,952,766 | 4/1976 | Johnson . | |
| 4,290,454 | 9/1981 | Shetler . | |

Primary Examiner—Gerald A. Michalsky
Attorney, Agent, or Firm—Zarley, McKee, Thomte, Voorhees & Sease

[57] ABSTRACT

The present invention comprises an outer housing and an inner housing having a pressure relief chamber defined therebetween. The inner housing receives fluid and directs it through a pressure outlet opening into the pressure relief chamber. The outer housing includes an outlet opening and a pressure relief opening. A flexible cylindrical seal surrounds the pressure outlet opening of the inner housing and is yieldably movable radially outwardly to a pressure flow position wherein it closes the pressure relief opening of the outer housing and opens the pressure outlet opening of the inner housing.

7 Claims, 7 Drawing Figures

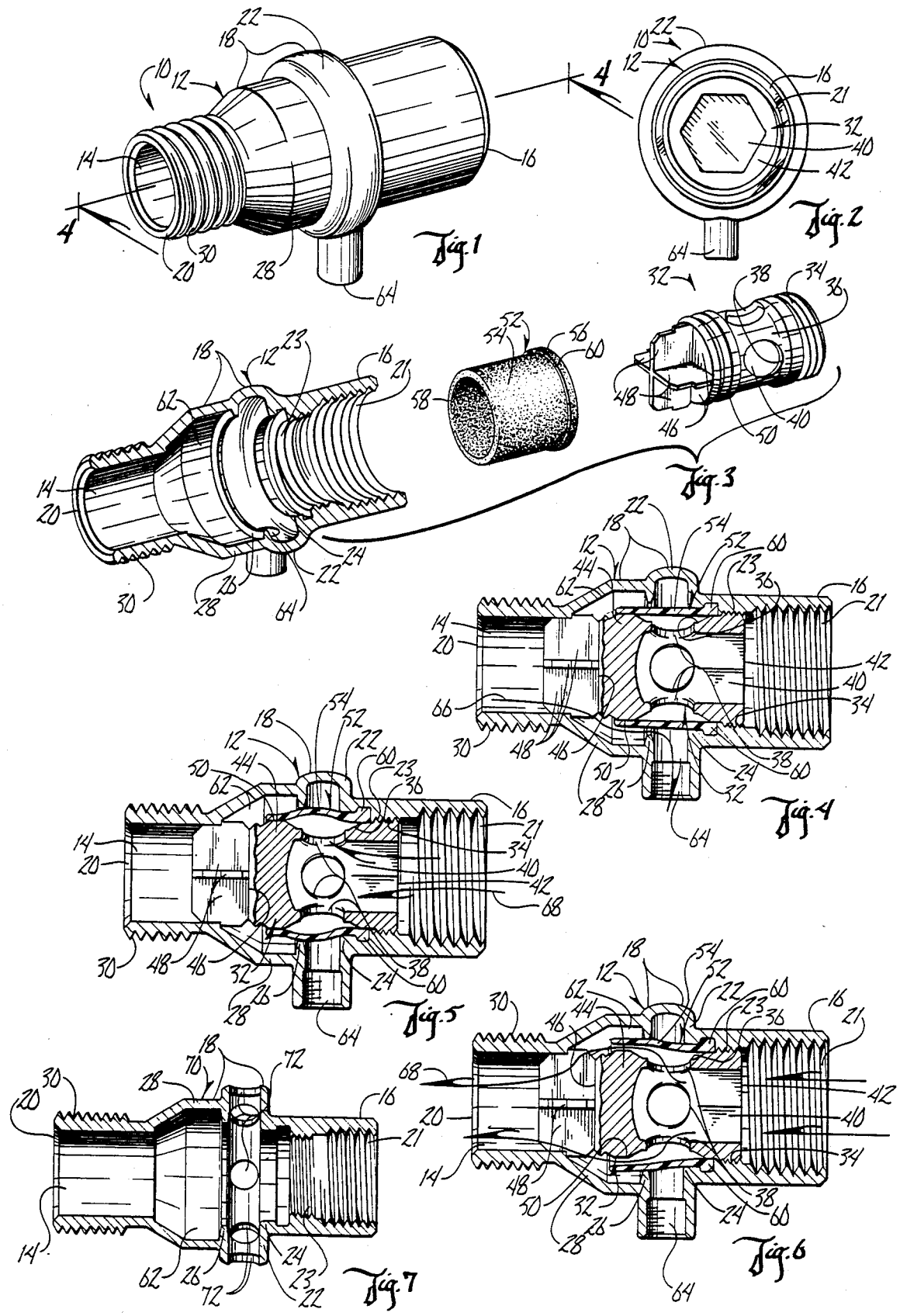

VACUUM BREAKER

BACKGROUND OF THE INVENTION

This invention relates to vacuum breakers.

Vacuum breakers have been used in various water and plumbing systems to prevent a back flow or back siphoning of water from the outlet end of a hose or other water outlet. This can occur when a lowered pressure from the water source is encountered and an elevated pressure is encountered at the discharge or outlet of the water system.

Under such a condition, reverse flow can occur from the discharge end of the water system into the water supply. This can under certain conditions, result in contamination being introduced to the water supply system.

In order to prevent this back flow situation, hydrants or other fluid couplings are sometimes provided with vacuum breakers and back flow preventers. These devices sense a reverse pressure in the system and relieve the pressure so that fluid does not flow backwards into the water supply system through the hydrant.

Therefore, a primary object of the present invention is the provision of an improved vacuum breaker.

A further object of the present invention is the provision of an improved vacuum breaker which utilizes a single elastomeric sealing member for accomplishing both the vacuum breaking function and the back flow preventing function.

A further object of the present invention is the provision of a device which is reliable throughout extensive operation.

A further object of the present invention is the provision of a device which is sensitive to small differentials in pressure, and responds to small differentials in pressure so as to move from its normal to its back flow preventing positions.

A further object of the present invention is the provision of a device which is economical to manufacture, durable in use and efficient in operation.

SUMMARY OF THE INVENTION

The present invention utilizes an outer cylindrical housing having a bore extending through the length of the housing. The bore includes an inlet portion, an outlet portion and an intermediate portion therebetween. A pressure relief opening is provided in the intermediate portion.

Fitted within the outer housing is a cylindrical insert which is attached within the inlet end of the housing bore and which includes one end extending within the intermediate portion of the housing bore. The second end of the insert is spaced radially inwardly from the intermediate portion of the bore so as to define a pressure relief chamber therebetween. The insert includes a cavity having a plurality of pressure outlet openings extending radially outwardly therefrom so as to provide communication from the cavity within the insert to the pressure release chamber surrounding the insert.

A cylindrical rubber seal is fitted around the insert so as to be in covering relation over the radially extending pressure outlet openings therein. The sealing member is responsive to fluid pressure from within the insert so as to expand radially outwardly and form a sealing engagement over the pressure relief opening within the intermediate portion of the housing.

In operation, fluid is introduced into the cavity within the insert member. The fluid pressure causes the rubber sealing member to expand radially outwardly so that it covers up and seals the pressure relief opening within the intermediate portion of the outer housing. This permits fluid to flow from the insert outwardly through the pressure outlet openings thereof into the pressure relief chamber and thence outwardly through the outlet portion of the housing.

When fluid pressure is shut off from the insert member, the sealing member moves by virtue of its own resiliency back into sealing engagement over the pressure outlet openings of the insert member. However, in moving to this position, the rubber seal opens the pressure relief opening in the outer housing. Thus, fluid is free to flow in a reverse direction from the outlet opening of the housing into the pressure relief chamber and thence outwardly through the pressure relief opening. Thus, the pressure relief opening provides a vacuum breaking function, and the rubber seal provides a back flow preventing function because it is in covering relation over the pressure outlet openings of the insert member.

The device is simple in construction, and requires only a single rubber seal, whereas most vacuum breakers presently known require two or more seals to provide all of the functions accomplished with the present invention.

DETAILED DESCRIPTION OF THE FIGURES OF THE DRAWINGS

FIG. 1 is a perspective view of the present invention.

FIG. 2 is an end view as seen from the right end of the device shown in FIG. 1.

FIG. 3 is an exploded perspective view showing the outer housing in seciton and showing the insert and rubber seal in solid lines.

FIG. 4 is a sectional view taken along line 4—4 of FIG. 1.

FIG. 5 is a sectional view similar to FIG. 4, but showing the seal in its intermediate position.

FIG. 6 is a view similar to FIGS. 4 and 5, but showing the seal in its totally expanded position.

FIG. 7 is a sectional view of a modified form of housing without the insert in place.

DETAILED DESCRIPTION OF THE PREFERRED EMBODIMENT

Referring to the drawings, the numeral 10 generally designates the vacuum breaker of the present invention. Vacuum breaker 10 includes an outer housing 12 having an elongated bore 14 extending longitudinally therethrough. Housing 12 includes a cylindrical inlet portion 16, an intermediate portion 18, and an outlet portion 20. Within inlet portion 16, the interior walls of bore 14 are provided with threads 21. Within intermediate portion 18, a second set of threads 23 are provided.

Intermediate portion 18 includes an annular pressure relief groove 22 which extends around the circumference thereof. Groove 22 includes annular flanges 24, 26 on the opposite edges of groove 22 and these flanges 24, 26 protrude radially inwardly into the intermediate portion of bore 14.

Intermediate portion 18 also includes an enlarged diameter portion 28 which tapers radially inwardly toward outlet portion 20. Outlet portion 20 is provided with a plurality of threads 30 on its outer cylindrical surface.

The numeral 32 generally designates an insert member which is adapted to be inserted within bore 14. Insert member 32 includes a rear threaded end 34 which is adapted to threadably engage the threads 23 within intermediate portion 18 of bore 14.

Insert member 22 also includes an annular groove 36 which is positioned in registered alignment within the annular pressure relief groove 22 as shown in FIGS. 4-6 whenever the insert member is threaded within bore 14. At the bottom of groove 36 are a plurality of radially extending pressure outlet holes 38 which provide communication into a cavity 40 which is located within insert member 32. The rear end of insert member 32 includes an open end 42 which is shaped in a hexagonal shape as shown in FIG. 2 so as to receive a wrench for rotating the insert member as it is threaded into position. The forward end of insert member 32 is solid and this solid portion is designated by the numeral 44. Attached to the forward end 46 of insert member 32 are a plurality of vanes 48. As can be seen in FIGS. 4-6, vanes 48 engage the housing of outlet portion 20 of outer housing 10 when the threaded insert 32 is threaded within bore 14.

An annular shoulder 50 extends around the outside of insert member 32 adjacent groove 36.

Fitted around the outside of insert 32 is a rubber seal member 52. Seal member 52 includes a cylindrical portion 54, a rear axial end 56 and a forward axial end 58. Rear axial end 56 includes an annular ridge 60. Sealing member 52 surrounds annular member 32 in the position shown in FIGS. 4-6 with the rear end 56 of sealing member 32 being on the rearward side of annular groove 36 and holes 38 and with the forward end 58 resting in engagement with annular shoulder 50. When the insert member 32 is threaded within bore 14, annular ridge 60 fits within an annular groove within bore 14 so that the rear end 56 of sealing member 32 is tightly held against insert 32.

The forward end 58 of seal member 52, however, is free to expand radially outwardly away from shoulder 50.

In operation, the insert 52 is fitted within bore 14 to the position shown in FIG. 4. In this position, the sealing member 52 spans annular groove 36 and provides a sealing of the openings 38 therein. It should be noted that the insert member is spaced radially inwardly from the intermediate portion 18 of housing 12 so as to define a pressure relief chamber 62 therebetween. When the sealing member is in its normal position as shown in FIG. 4, fluid communication is provided from the outlet portion 20 of housing 12, into the pressure relief chamber 62 and also into the annular pressure relief groove 22. Pressure relief groove 22 is provided with a pressure relief opening 64 which permits the fluid to flow outwardly in the path indicated by arrow 66. This permits water within a hose attached to the outlet opening 20 to flow in a reverse direction into the outlet portion 20 and into the pressure relief chamber 62 and outwardly through the pressure relief opening 64. The seal 52 prevents fluid from flowing backward into the holes 38 and hence into the inlet portion 16 of bore 14. Furthermore, as the back flow pressure increases, the tightness of the seal member around holes 38 is increased so as to insure that a back flow condition will not occur.

FIG. 5 shows the position of the seal as fluid pressure is introduced to the inlet portion 16 of bore 14. As the pressure is initialy increased within cavity 40 of insert 32, it causes pressure to be exerted radially outwardly on the sealing member 32. Consequently, a bulge occurs in the central cylindrical portion 54 of seal 32. This bulge engages the annular flanges 24, 26 of pressure relief groove 22, thereby closing communication from pressure relief chamber 62 to the pressure relief opening 64 as shown in FIG. 5.

Continued increase in pressure within cavity 40 causes the seal member to move to the position shown in FIG. 6. A comparison of FIGS. 5 and 6 shows that the forward end 58 of sealing member 32 remains in sealed engagement with annular shoulder 50 in the position shown in FIG. 5. However, a continued increase in the pressure within cavity 40 causes the end 58 of sealing member 32 to expand radially outwardly so as to permit fluid to flow from the holes 38 around shoulder 50 and into outlet portion 20 of bore 14, as indicated by the arrows 58 in FIG. 6.

When the fluid pressure source is shut off from inlet portion 16 of housing 12, the natural resiliency of sealing member 32 causes it to return to its original normal position shown in FIG. 4. This permits any back pressure or back flow of fluid to escape outwardly through pressure relief opening 64.

Sometimes during the operation of a valve such as shown in FIGS. 4-6, a condition can develop wherein the pressure is greater in the outlet portion 20 of bore 14 than it is in the inlet portion 16 of bore 14. When this occurs in devices which do not have a vacuum breaker, the fluid within the outlet portion 20 can siphon in a reverse direction back into the water supply system.

However, the present invention prevents this. With the present invention, when a lower pressure is encountered within the inlet portion 16 than is encountered within the outlet portion 20 of bore 14, the rubber seal 32 is permitted by virtue of its resiliency to return to its normal position shown in FIG. 4. This is true regardless of whether or not the fluid pressure within inlet opening 14 is shut off. Thus, with the rubber seal 33 in its normal position as shown in FIG. 4, the pressure is relieved by virtue of pressure relief opening 64.

The device is simple in construction and requires only one rubber seal for operation. Furthermore, wear and leakage around the sealing member is minimal by virtue of this specific construction described above.

Referring to FIG. 7, a modified form of the outer housing is shown and is designated by the numeral 70. The housing 70 shown in FIG. 7 is identical to the housing 12 shown in FIG. 1 with the exception that a plurality of pressure outlet openings 72 are provided around the circumference of annular groove 22. The other identical parts are marked with numerals which correspond to the numerals used in the device of FIG. 1.

Thus, it can be seen that the device accomplishes at least all of its stated objectives.

What is claimed is:

1. A vacuum breaker comprising:
an outer housing having an elongated bore extending therethrough, said bore having an inlet portion, an outlet portion and an intermediate portion between said inlet and outlet portions;
said housing having a pair of annular spaced apart flanges each extending around the circumference of said intermediate portion of said bore and protruding radially inwardly from said intermediate portion of said bore, said spaced apart flanges defining an annular pressure relief groove therebetween;

said housing having at least one radially extending pressure relief opening within said pressure relief groove between said spaced apart annular flanges for providing communication from said intermediate portion of said bore to the atmosphere outside said housing;

an insert member having a first end fitted in sealing engagement with said inlet portion of said bore, said insert member having a second end extending within said intermediate portion of said bore, said second end having an outer surface which is spaced radially inwardly from said intermediate portion of said bore to define a pressure relief chamber therebetween;

said second end of said insert member being provided with an annular shoulder extending around the outer surface thereof;

said insert member having a cavity therein, a pressure inlet opening providing fluid communication from said inlet portion of said bore to said cavity, and at least one pressure outlet opening providing fluid communication from said cavity to said pressure relief chamber, said pressure outlet opening being positioned between said first end of said insert member and said annular shoulder;

elongated resilient sealing means having a cylindrical portion surrounding said insert member, said cylindrical portion having a first end surrounding and sealingly engaging said first end of said insert member, said cylindrical portion of said sealing means having a second end normally surrounding and sealingly engaging said annular shoulder of said insert member;

said sealing means being yieldably radially expandable in response to fluid pressure within said cavity of said insert member from a normal position wherein said second end of said cylindrical portion of the sealing means engages said annular shoulder so as to close off said pressure outlet opening from communication with said pressure relief chamber, to a pressure flow position wherein said cylindrical portion expands radially outwardly from said annular shoulder and engages both of said annular flanges of said pressure relief groove so as to open said pressure outlet opening of said insert to communication with said outlet portion of said bore and also so as to close off said pressure relief opening from communication with said pressure relief chamber.

2. A vacuum breaker according to claim 1 wherein said first end of said insert member is in threaded engagement within said inlet portion of said bore.

3. A vacuum breaker according to claim 1 wherein said second end of said insert member includes an annular groove extending around said insert member, said pressure outlet opening of said insert being located within said groove.

4. A vacuum breaker according to claim 3 wherein said second end of said cylindrical portion of said sealing means spans said groove and pressure outlet opening of said insert member and normally sealingly engages said insert member on opposite axial sides of said groove and pressure outlet opening of said insert member.

5. A vacuum breaker according to claim 1 wherein said second end of said insert member is at least partially spaced axially from said outlet portion of said bore so that fluid is free to flow between said pressure relief chamber and said outlet portion of said bore.

6. A vacuum breaker according to claim 5 wherein said second end of said sealing member is spaced axially from said outlet portion of said bore whereby fluid is free to flow between said outlet portion of said bore and said pressure relief chamber throughout the time when said sealing means moves between said normal to said pressure flow positions.

7. A vacuum breaker according to claim 1 wherein said resilient sealing means is movable to an intermediate position between said normal position and said pressure flow position in response to an initial surge of fluid pressure within said cavity, said resilient sealing means being in sealing engagement over both said pressure outlet opening and said two annular flanges of said pressure relief opening whenever said sealing means is in said intermediate position, said sealing means being movable from said intermediate position to said pressure flow position in response to a continued increase of fluid pressure after said initial surge of fluid pressure.

* * * * *